US007177753B2

(12) United States Patent
Bader

(10) Patent No.: US 7,177,753 B2
(45) Date of Patent: Feb. 13, 2007

(54) METHOD FOR LIMITING THE ROTATIONAL SPEED OF INTERNAL COMBUSTION ENGINES

(75) Inventor: Andreas Bader, Neuhausen a.d.F. (DE)

(73) Assignee: Dr. Ing. h.c.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 11/195,612

(22) Filed: Aug. 3, 2005

(65) Prior Publication Data

US 2006/0032480 A1 Feb. 16, 2006

(51) Int. Cl.
*B60T 7/12* (2006.01)
*F02D 41/00* (2006.01)

(52) U.S. Cl. ........................ 701/103; 123/361; 123/334

(58) Field of Classification Search ........ 701/101–104, 701/110, 111, 113; 123/334, 350, 351, 339.11, 123/462, 406.35, 406.36, 406.47

See application file for complete search history.

(56) References Cited

U.S. PATENT DOCUMENTS 6,098,574 A * 8/2000 Arakawa et al. .......... 123/41 E
6,371,081 B1 * 4/2002 Hawkins et al. ............ 123/352
6,581,584 B2 * 6/2003 Sato et al. .................. 123/599
2004/0038775 A1 * 2/2004 Shimizu et al. ................ 477/6
2004/0255903 A1 12/2004 Esteghlal

FOREIGN PATENT DOCUMENTS

DE 33 19 025 C2 11/1984
DE 199 13 272 A1 9/2000
DE 101 41 600 A1 3/2003

* cited by examiner

*Primary Examiner*—John T. Kwon
(74) *Attorney, Agent, or Firm*—Crowell & Moring LLP

(57) ABSTRACT

A method for limiting the rotational speed in an internal combustion engine is provided. A detection device detects prevailing operating parameters. Based on the prevailing operating parameters, the control variables for the ignition, injection and throttle valve position are determined. When the prevailing rotational speed ($n_{act}$) reaches a preselectable maximum rotational speed value ($n_{max}$), through a change in at least one of the control variables, the rotational speed is limited to this preselectable maximum rotational speed value, and a hard rotational speed limitation is achieved by fade-in and fade-out of the injection and/or by intervention in the ignition with simultaneous support by the throttle valve and whereby a soft rotational speed limitation is achieved by retarding the ignition and by varying the throttle valve. Activation of a soft rotational speed limitation or hard rotational speed limitation is coordinated by the control unit according to the requirements of driving performance.

9 Claims, 3 Drawing Sheets

METHOD FOR LIMITING THE ROTATIONAL SPEED OF INTERNAL COMBUSTION ENGINES

The present application claims priority under 35 U.S.C. § 119 to German Patent Application No. 102 2004 037 773.1-26, filed Aug. 4, 2004, the entire disclosure of which is herein expressly incorporated by reference.

BACKGROUND AND SUMMARY OF THE INVENTION

The present invention relates to a method for limiting the rotational speed of internal combustion engines with spark ignition.

German Patent Document DE 33 19 025 C2 describes a method and a device for limiting the rotational speed of internal combustion engines having spark ignition, whereby on reaching a first definable rotational speed value, the fuel mixture is made leaner and the ignition sequence is worsened and at a second rotational speed value, which is greater than the first rotational speed value, a switch is made to a much leaner fuel mixture.

In comparison with the known method, the method of the present invention has the advantage that the combination of a soft rotational speed limitation and a hard rotational speed limitation complies with demands for comfort while also complying with demands for an extremely sporty driving performance in vehicles having high-performance engines. In internal combustion engines having high-performance engines, reducing torque only through injection fade-out and delaying injection results in excessively high rotational speed amplitudes in the area of the desired maximum rotational speed, which is perceived as unpleasant by the driver. In contrast, limiting the rotational speed by regulating the throttle valve on the vehicle cannot be perceived directly by the driver with a very sporty driving style and for power measurements.

In accordance with the method of the present invention, the function of the hard rotational speed limitation is implemented in such a way that the duration of the cylinder fade-out and the interval of the fade-outs and/or the non-fade-out of the engine are applied in any way desired via a control unit. The duration of turning the injection on and off with or without ignition intervention can be adjusted in any way and at the same time is regulated via intervention involving the electric throttle valve.

Another advantage is obtained with the inventive control method due to the fact that the switching between a hard and a soft rotational speed limitation can be adjusted according to the desired driving performance. Thus, it is conceivable for the control to first trigger a hard rotational speed limitation and later to switch for several seconds to a soft rotational speed limitation or vice-versa. The background for such switching from hard and soft rotational speed limitation may be provided by the requirements of the engine and the catalytic converter. The change from a soft to a hard rotational speed limitation may be desirable when the driver is to receive feedback that he should shift to the next higher gear.

Another advantageous embodiment is possible with the inventive rotational speed limitation due to the fact that different maximum rotational speeds may be regulated for any period of time and for any gears. The driving performance of the internal combustion engine can thus be adapted even better to various requirements. All the variables to be controlled can, for example, be stored in a control unit and can be determined in the application.

BRIEF DESCRIPTION OF THE DRAWINGS

The inventive method is depicted in the exemplary embodiment and is explained in greater detail in the following description.

The inventive triggering is explained in greater detail below with reference to the figures.

DETAILED DESCRIPTION

Figure 1:
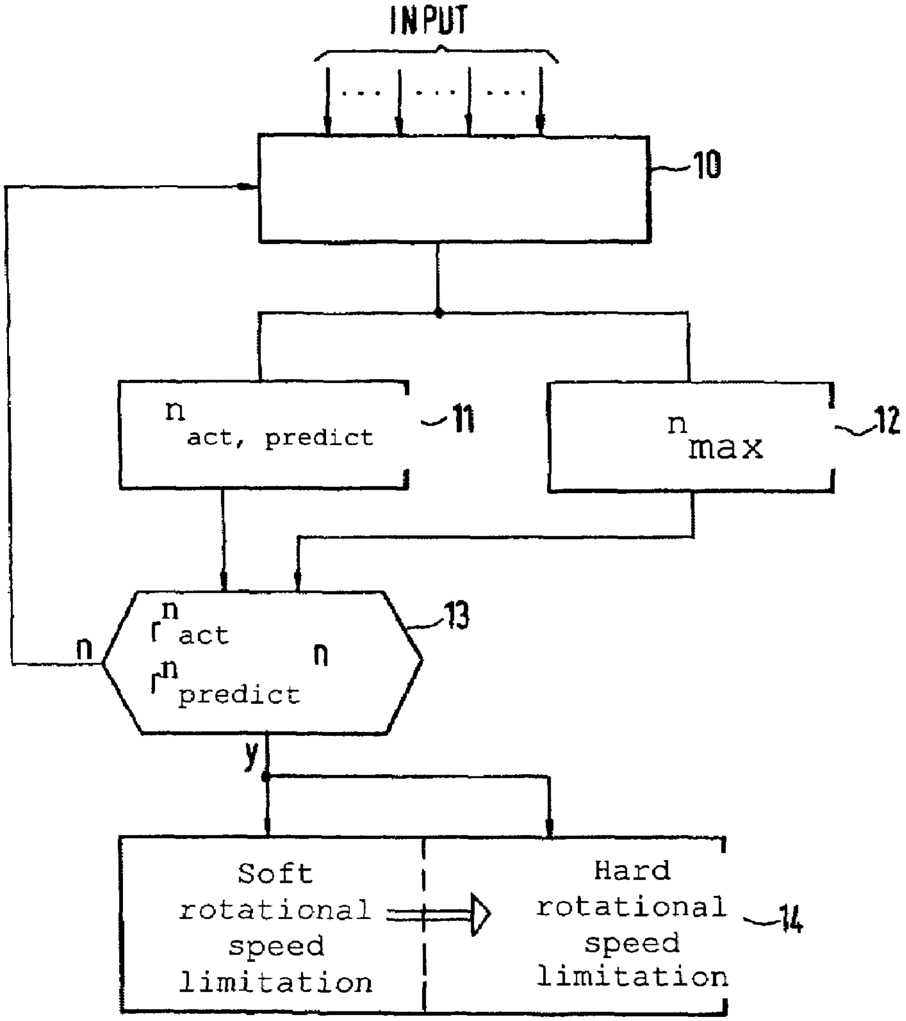
FIG. 1 shows a schematic overview of the process steps for implementing the method according to exemplary embodiments of the present invention.

FIG. 1 shows a schematic overview of the inventive process in which various operating parameters are detected in a first operating step 10. The individual sensors are typically already present in the vehicles and the values need only be read out. Accordingly, additional sensors are not required to detect these operating parameters.

The input variables detected include, for example, the load, the temperature, the prevailing fuel consumption, the pressure and the position of the throttle valve. Based on the detected operating data of the internal combustion engine thus detected, the prevailing rotational speed in $n_{act}$ is determined in working step 11. Optionally, a predictive analysis of the rotational speed to be expected may also be performed. This means that a "predictive" rotational speed $n_{predict}$ is calculated on the basis of a prediction time which is programmable as a function of gear.

In parallel with operating step 12, the individual control variables for ignition, injection and throttle valve position and the prevailing gear are determined with the help of various stored engine characteristics maps, and the maximum allowed rotational speed $n_{max}$ for this operating point is determined on the basis of the control variables.

The outputs of the operating step 11 and the operating step 12 are connected to decision step 13. Here the maximum allowed rotational speed $n_{max}$ is compared with the prevailing (actual) $n_{act}$ rotational speed or optionally the predictively determined rotational speed $n_{predict}$. If the prevailing rotational speed $n_{act}$ or the predictive rotational speed $n_{predict}$ is smaller than the maximum allowed rotational speed $n_{max}$, then the question $n_{act} \geqq n_{max}$ and/or the question $n_{predict} \geqq n_{max}$ would both be answered in the negative, and the method would return to the first operating step 11. In other words, there would be no need for action and the monitoring of the prevailing operating conditions and rotational speed would begin anew.

If the query 11 $n_{act} \geqq n_{max}$ or $n_{predict} \geqq n_{max}$ is answered in the affirmative, i.e., the maximum allowed rotational speed $n_{max}$ is exceeded by the prevailing rotational speed $n_{act}$ or if the predicted rotational speed has occurred, then in a subsequent operating step 14 the respective intervention to limit the rotational speed is determined on the basis of the prevailing parameters.

In this case, a hard rotational speed limitation with support of the electric throttle valve and a soft rotational speed limitation interfere with one another or are activated in alternation depending on the requirements of the internal combustion engine.

Figure 2:
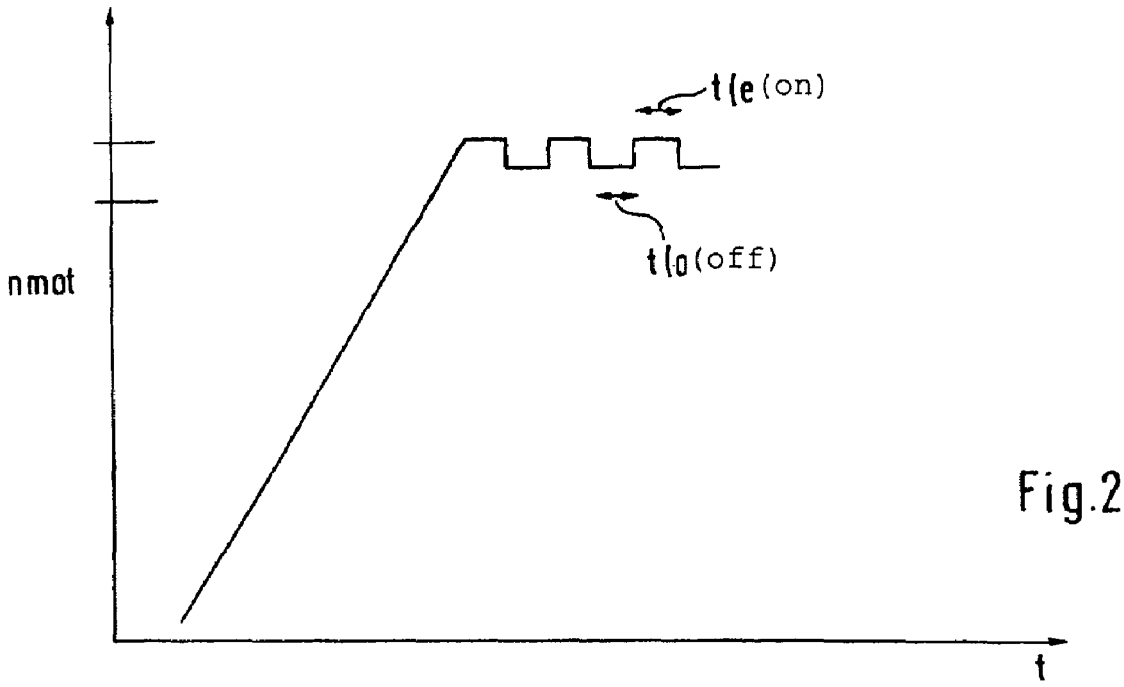
FIG. 2 shows a first diagram for rotational speed limitation with variable fade-in and fade-out of the engine.

FIG. 2 shows a diagram of rotational speed over time as implemented by the rotational speed limitation. This diagram indicates a hard rotational speed limitation, i.e., the rotational speed is limited here by fading out the engine, whereby to implement this either no fuel is injected into the cylinder and the ignition is varied proportionately by shifting the ignition point in time to retarded ignition. The times for fade-out of the engine ($t_{off}$) and restarting of the engine ($t_{on}$) as well as the intervals are parameterizable by the control unit and are adaptable to prevailing conditions. For support, the throttle valve is altered to the extent that the torque is reduced.

Figure 3:
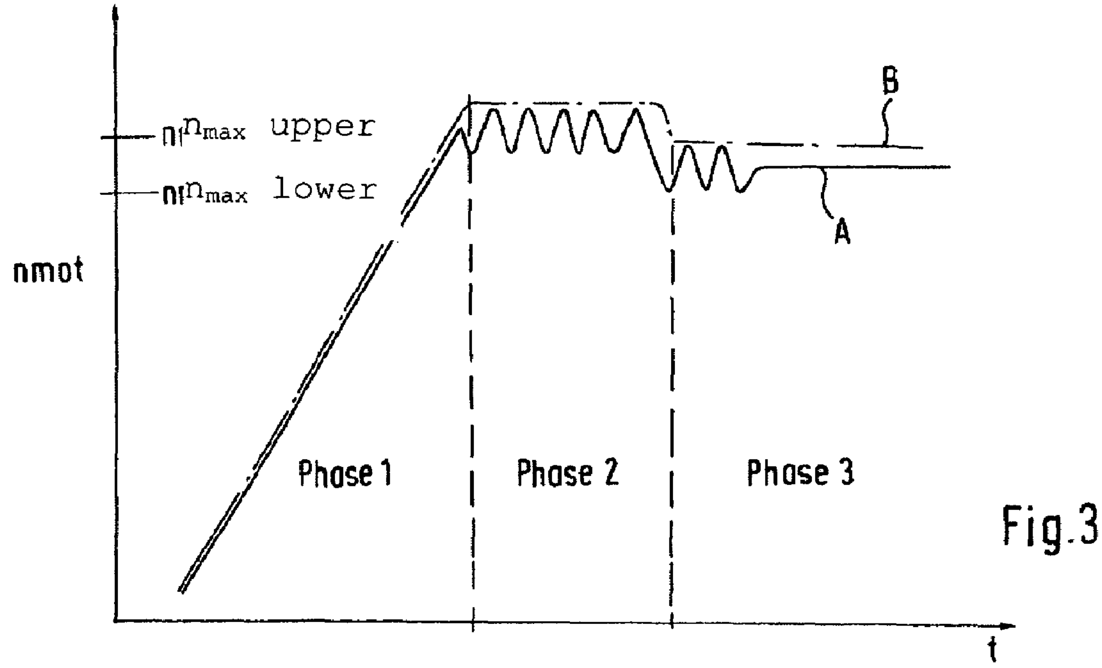
FIG. 3 shows a second diagram of rotational speed limitation with a variable maximum rotational speed with hard and soft rotational speed limitation.

The diagram depicted in FIG. 3 shows a rotational speed limitation, where variable maximum rotational speeds are implementable, with a hard rotational speed limitation being indicated by the solid line A and the soft rotational speed limitation being indicated by the dotted line B. At least two different maximum rotational speeds are shown on the ordinate, which illustrates the rotational speed of the engine with $n_{max}$ upper and $n_{max}$ lower. In this diagram phase 1 denotes a period of time in which the rotational speed increases from a starting value up to the first upper maximum value. As soon as $n_{max}$ upper has been reached, the rotational speed is limited either by temporarily but recurring fade-out of the engine, i.e., by fade-out of the injection and/or ignition with throttle valve support (see line A) or it is limited by a soft rotational speed limitation achieved by decreasing the torque (see line B). FIG. 3 shows the time in which the motor is limited to an upper maximum rotational speed value, indicated with phase 2. In order for the motor not to be overloaded, after a specifiable period of operation of the motor at the upper maximum rotational speed, the rotational speed is limited to a lower maximum rotational speed value $n_{max}$ lower. This is where phase 3 begins. The rotational speed limitation per se is implemented as shown in phase 2 either by fading out the engine function (line A) or by reducing the torque (line B). Briefly providing an increased maximum rotational speed has the advantage that better acceleration times can be achieved.

Figure 4:
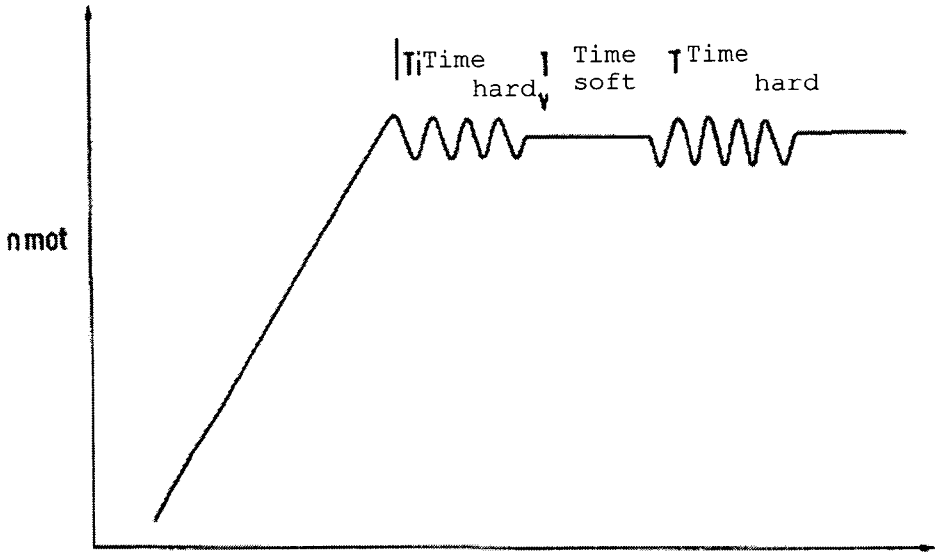
FIG. 4 shows a third diagram of the rotational speed limitation with a change between hard and soft rotational speed limitation.

The diagram shown in FIG. 4 illustrates the change between a hard rotational speed limitation and a soft rotational speed limitation. Whereas in hard rotational speed limitation the intervention by the driver is definitely perceptible in the driving performance of the vehicle, in soft rotational speed limitation the intervention is performed in a manner that is gentler on the engine and is not directly perceptible by the driver by briefly retarding ignition and at the same time closing the throttle valve.

The intervention of a soft or hard rotational speed limitation may be specified for different drivers or driving styles in the control unit as needed. The change between the two variants of rotational speed limitation offers the advantage that the engine and the catalyst are protected by changing from hard to soft rotational speed limitation, whereas in changing from soft to hard rotational speed limitation the driver receives feedback that draws his attention to the fact that he should shift to the next higher gear.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for limiting the rotational speed in an internal combustion engine with a device for detecting preselectable operating parameters, with at least one device for determining control variables for ignition, injection and throttle valve position based on the detected operating parameters, whereby on reaching a preselectable rotational speed value ($n_{max}$) the rotational speed is limited to the preselectable rotational speed value by varying at least one of the control variables, wherein the injection is faded in and out with or without simultaneous intervention in the ignition with simultaneous support by the electric throttle valve which causes a hard limitation on rotational speed which is combined with a soft limitation on rotational speed accomplished by varying the throttle valve, whereby the combination of hard and soft rotational speed limitation is accomplished according to a desired driving performance.

2. The method as claimed in claim 1, wherein the hard rotational speed limitation at which injection is faded out is adjustable in any duration of fade-out and in any interval of fade-out through supportive throttle valve intervention.

3. The method as claimed in claim 1, wherein maximum rotational speeds that are variable over time are adjustable depending on the requirement of the driving performance.

4. The method as claimed in claim 2, wherein maximum rotational speeds that are variable over time are adjustable depending on the requirement of the driving performance.

5. A method for limiting the rotational speed in an internal combustion engine, comprising the acts of:

detecting preselectable operating parameters;

determining control variables for ignition, injection and throttle valve position based on the detected operating parameters, limiting the rotational speed to the preselectable rotational speed value by varying at least one of the control variables when a preselectable rotational speed value is reached; and fading in and out the injection with simultaneous support by the electric throttle valve, which causes a hard limitation on rotational speed and which is combined with a soft limitation on rotational speed accomplished by varying the throttle valve, wherein the combination of the hard and soft limitation is performed according to a desired driving performance.

6. The method of claim 5, wherein the fading in and out is performed with simultaneous intervention in the ignition.

7. The method of claim 5, wherein the fading in and out is performed without simultaneous intervention in the ignition.

8. The method as claimed in claim 5, wherein the hard rotational speed limitation at which injection is faded out is adjustable in any duration of fade-out and in any interval of fade-out through supportive throttle valve intervention.

9. The method as claimed in claim 5, wherein maximum rotational speeds that are variable over time are adjustable depending on the requirement of the driving performance.

* * * * *